US011330565B2

United States Patent
Nguyen et al.

(10) Patent No.: US 11,330,565 B2
(45) Date of Patent: May 10, 2022

(54) FEEDBACK FOR MULTICAST PEER-TO-PEER COMMUNICATIONS

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Arjun Bharadwaj, Cupertino, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/836,826

(22) Filed: Mar. 31, 2020

(65) Prior Publication Data

US 2020/0314808 A1 Oct. 1, 2020

Related U.S. Application Data

(60) Provisional application No. 62/827,297, filed on Apr. 1, 2019.

(51) Int. Cl.
| | | |
|---|---|---|
| *H04W 4/00* | (2018.01) | |
| *H04W 72/04* | (2009.01) | |
| *H04W 4/40* | (2018.01) | |
| *H04W 4/06* | (2009.01) | |
| *H04W 4/02* | (2018.01) | |
| *H04L 1/18* | (2006.01) | |

(52) U.S. Cl.
CPC .......... *H04W 72/04* (2013.01); *H04L 1/1812* (2013.01); *H04W 4/023* (2013.01); *H04W 4/06* (2013.01); *H04W 4/40* (2018.02)

(58) Field of Classification Search
CPC ....... H04W 72/04; H04W 4/40; H04W 4/023; H04W 4/06; H04L 1/1812
See application file for complete search history.

(56) References Cited

U.S. PATENT DOCUMENTS

| | | | |
|---|---|---|---|
| 2008/0254743 A1 | 10/2008 | Nishikawa et al. | |
| 2011/0159799 A1* | 6/2011 | Chen | H04L 1/1867 455/3.01 |
| 2014/0362795 A1 | 12/2014 | Choi et al. | |
| 2015/0249544 A1* | 9/2015 | Cho | H04L 12/1886 370/312 |
| 2015/0256354 A1* | 9/2015 | Zeger | H04L 45/00 370/312 |
| 2017/0310427 A1* | 10/2017 | Wakabayashi | H04L 5/001 |
| 2018/0242315 A1* | 8/2018 | Sun | H04W 72/0446 |
| 2020/0205166 A1* | 6/2020 | Huang | H04W 72/00 |

OTHER PUBLICATIONS

International Search Report and Written Opinion—PCT/US2020/026180—ISAEPO—dated Jun. 16, 2020.

* cited by examiner

*Primary Examiner* — Erika A Washington
(74) *Attorney, Agent, or Firm* — Patterson + Sheridan, LLP

(57) ABSTRACT

Aspects of the present disclosure propose a mechanism whereby a nearby device may detect scenarios where one device is unable to receive communications from a transmitting device. For example, the nearby device may detect that concurrent transmissions of a transmitting device and intended recipient prevent reception by the intended recipient and provide feedback to the transmitting device. Rather than blindly retransmitting, the transmitting device may only retransmit when it receives feedback from the nearby device, saving power and avoiding unnecessary transmissions.

26 Claims, 9 Drawing Sheets

FEEDBACK FOR MULTICAST PEER-TO-PEER COMMUNICATIONS

PRIORITY CLAIM(S)

This application claims priority to and the benefit of U.S. Provisional Application No. 62/827,297, filed on Apr. 1, 2019, which is expressly incorporated by reference in its entirety as if fully set forth below and for all applicable purposes.

BACKGROUND

Field of the Disclosure

Aspects of the present disclosure relate generally to wireless communications systems, and more particularly, to increasing reliability of multi-cast peer-to-peer communications.

Description of Related Art

Wireless communication systems are widely deployed to provide various telecommunication services such as telephony, video, data, messaging, broadcasts, etc. These systems may employ multiple-access technologies capable of supporting communication with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more gNBs may define an e NodeB (eNB). In other examples (e.g., in a next generation, new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a NR BS, a NR NB, a network node, a 5G NB, a next generation NB (gNB), etc.). A gNB or DU may communicate with a set of UEs on downlink channels (e.g., for transmissions from a base station or to a UE) and uplink channels (e.g., for transmissions from a UE to a gNB or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

Such improvements may help enable "peer to peer" communication between a variety devices, also referred to as device to device (D2D) communications. Examples of D2D communications include vehicle to everything (V2X) communications where a vehicle may communicate with another vehicle (V2V) or a different device, such as a base station, traffic control system, or the like (all of which may help enable autonomous driving).

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a user equipment (UE). The method generally includes detecting one or more transmissions that indicate a second UE is unable to receive a transmission from a third UE intended for the second UE and providing feedback to the third UE on behalf of the second UE, based on the detection, to prompt a retransmission from the third UE to the second UE.

Certain aspects of the present disclosure provide a user equipment (UE). The method generally includes sending a transmission intended for a second UE, receiving feedback from a third UE indicating the second UE is unable to receive the transmission intended for the second UE, and resending the transmission intended for the second UE, in response to the feedback.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
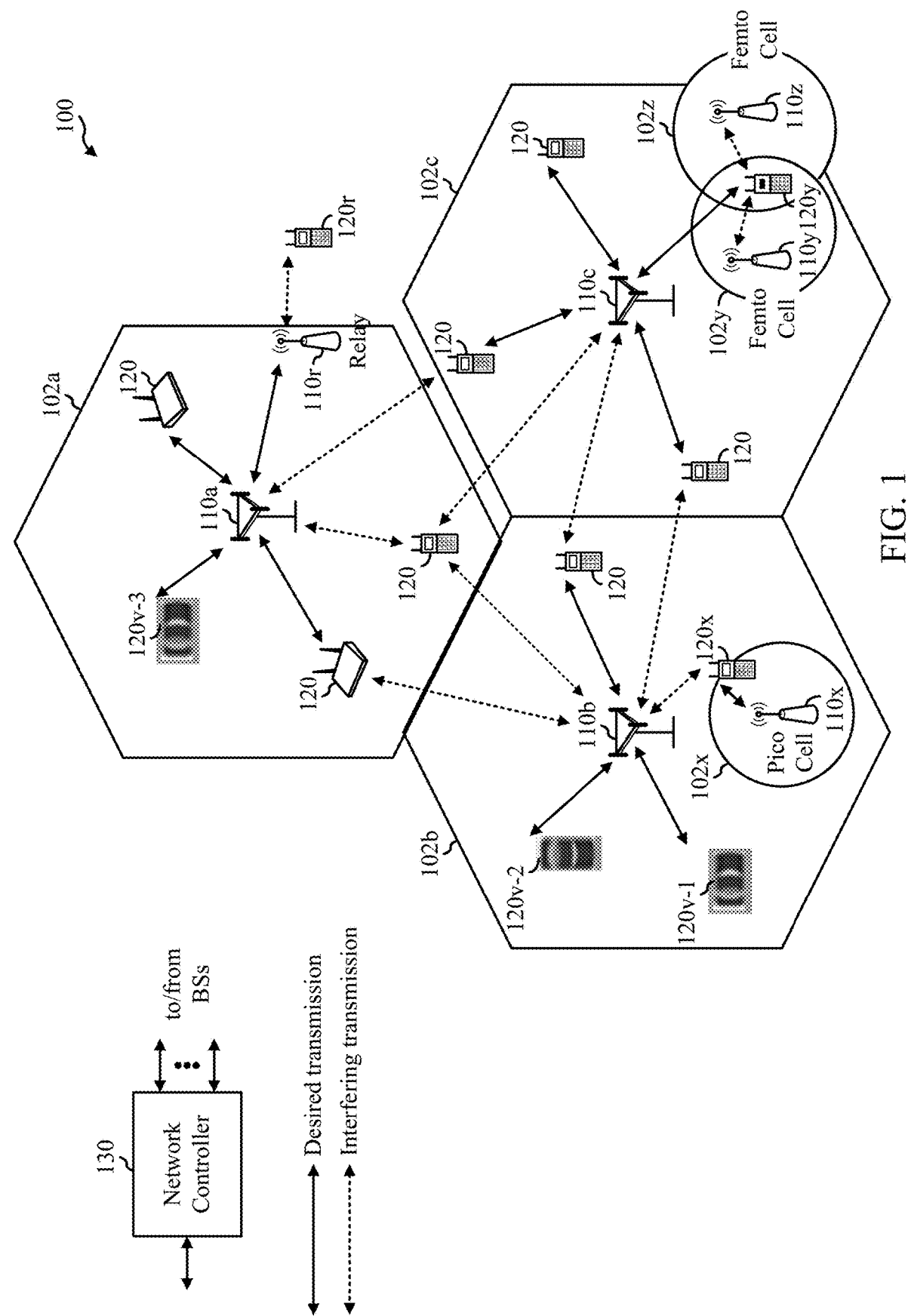
FIG. 1 is a block diagram conceptually illustrating an example telecommunications system, in accordance with certain aspects of the present disclosure.

As noted above, examples of peer-to-peer (also referred to as device-to-device or D2D) communications include vehicle to everything (V2X) communications where a vehicle may communicate with another vehicle (V2V) or a different device, such as a base station, traffic control system, or the like. Such systems are generally self-managed, without a central controller (such as a gNB) managing scheduling of traffic. In other words, it may be up to the peer devices themselves to decide when to transmit.

One challenge in V2X systems is how to ensure quality of service (QoS) objectives are met without overusing resources. One approach is to implement a feedback based retransmission mechanism. In such cases, a transmitter only retransmits its packet if it receives a negative acknowledgment (NACK) feedback indicating it did not successfully receive the packet. This approach may be implemented, for example, to ensure QoS for multicast traffic (or broadcast traffic) targeting a group of users.

One challenge presented in such scenarios is that certain portions of a transmission may not be received at a receiver device due to various factors. For example, due to half duplex (HD) constraints, a device may be only able to transmit or receive at any given time. In such cases, a first device may not be able to receive certain communications from a second device if the first and second devices are concurrently transmitting.

Because it is transmitting at the time, the first device may not even be aware of the communications from the second device and, thus, may not even provide feedback to prompt a retransmission. Thus, the second device may not know to retransmit the communication to the first device. In such cases, the second device could "blindly" retransmit in an effort to increase reliability. In this context, a blind retransmission generally refers to a retransmission sent without waiting or "looking" for feedback from the first device. Unfortunately blind retransmissions may waste system resources in the event the original transmission was actually received successfully. This waste results in unnecessary power consumption and creates transmissions that could interfere with transmissions from other devices.

Aspects of the present disclosure, however, propose a scheme in which a nearby device may detect scenarios where one device is unable to receive communications from a transmitting device (e.g., due to concurrent transmissions) and provide feedback to the transmitting device. Rather than blindly retransmit, the transmitting device may only retransmit when it receives feedback from the nearby device, saving power and avoiding unnecessary transmissions.

The techniques presented herein may be applied in various scenarios, such as NR (new radio access technology or 5G technology). NR may support various wireless communication services, such as enhanced mobile broadband (eMBB) targeting wide bandwidth (e.g. 80 MHz beyond), millimeter wave (mmW) targeting high carrier frequency (e.g. 27 GHz or beyond), massive machine type communications (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In certain systems, (e.g., 3GPP Release-13 long term evolution (LTE) networks), enhanced machine type communications (eMTC) are supported, targeting low cost devices, often at the cost of lower throughput. eMTC may involve half-duplex (HD) operation in which uplink transmissions and downlink transmissions can both be performed—but not simultaneously. Some eMTC devices (e.g., eMTC UEs) may look at (e.g., be configured with or monitor) no more than around 1 MHz or six resource blocks (RBs) of bandwidth at any given time. eMTC UEs may be configured to receive no more than around 1000 bits per subframe. For example, these eMTC UEs may support a max throughput of around 300 Kbits per second. This throughput may be sufficient for certain eMTC use cases, such as certain activity tracking, smart meter tracking, and/or updates, etc., which may consist of infrequent transmissions of small amounts of data; however, greater throughput for eMTC devices may be desirable for other cases, such as certain Internet-of-Things (IoT) use cases, wearables such as smart watches, etc.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, techniques presented herein may help improve the reliability of V2V communications between two UEs, such as UE 120v-1 and 120v-2, by providing a mechanism for a third UE, such as UE 120v-3 to provide feedback when it detects concurrent transmissions that would prevent UE 120v-2 from receiving transmission from UE 120v-1. In such cases, those UEs may perform operations 700 of FIG. 7 and/or operations 800 of FIG. 8.

The wireless network 100 may be, for example, a new radio (NR) or 5G network. A UE 120 may be configured for enhanced machine type communications (eMTC). The UE 120 may be considered a low cost device, low cost UE, eMTC device, and/or eMTC UE. The UE 120 can be configured to support higher bandwidth and/or data rates (e.g., higher than 1 MHz). The UE 120 may be configured with a plurality of narrowband regions (e.g., 24 resource blocks (RBs) or 96 RBs). The UE 120 may receive a resource allocation, from a gNB 110, allocating frequency hopped resources within a system bandwidth for the UE 120 to monitor and/or transmit on. The resource allocation can indicate non-contiguous narrowband frequency resources for uplink transmission in at least one subframe. The resource allocation may indicate frequency resources are not contained within a bandwidth capability of the UE to monitor for downlink transmission. The UE 120 may determine, based on the resource allocation, different narrowband than the resources indicated in the resource allocation from the gNB 110 for uplink transmission or for monitoring. The resource allocation indication (e.g., such as that included in the downlink control information (DCI)) may include a set of allocated subframes, frequency hopping related parameters, and an explicit resource allocation on the first subframe of the allocated subframes. The frequency hopped resource allocation on subsequent subframes are obtained by applying the frequency hopping procedure based on the frequency hopping related parameters (which may also be partly included in the DCI and configured partly through radio resource control (RRC) signaling) starting from the resources allocated on the first subframe of the allocated subframes.

As illustrated in FIG. 1, the wireless network 100 may include a number of gNBs 110 and other network entities. A gNB may be a station that communicates with UEs. Each gNB 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile gNB. In some examples, the gNBs may be interconnected to one another and/or to one or more other gNBs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A gNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A gNB for a macro cell may be referred to as a macro gNB. A gNB for a pico cell may be referred to as a pico gNB. A gNB for a femto cell may be referred to as a femto gNB or a home gNB. In the example shown in FIG. 1, the gNBs 110a, 110b and 110c may be macro gNBs for the macro cells 102a, 102b and 102c, respectively. The gNB 110x may be a pico gNB for a pico cell 102x. The gNBs 110y and 110z may be femto gNB for the femto cells 102y and 102z, respectively. A gNB may support one or multiple (e.g., three) cells.

The wireless network 100 may also include relay stations. A relay station is a station that receives a transmission of data and/or other information from an upstream station (e.g., a gNB or a UE) and sends a transmission of the data and/or other information to a downstream station (e.g., a UE or a gNB). A relay station may also be a UE that relays transmissions for other UEs. In the example shown in FIG. 1, a relay station 110r may communicate with the gNB 110a and a UE 120r in order to facilitate communication between the gNB 110a and the UE 120r. A relay station may also be referred to as a relay gNB, a relay, etc.

The wireless network 100 may be a heterogeneous network that includes gNBs of different types, e.g., macro gNB, pico gNB, femto gNB, relays, etc. These different types of gNBs may have different transmit power levels, different coverage areas, and different impact on interference in the wireless network 100. For example, a macro gNB may have a high transmit power level (e.g., 20 Watts) whereas pico gNB, femto gNB, and relays may have a lower transmit power level (e.g., 1 Watt).

The wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. The techniques described herein may be used for both synchronous and asynchronous operation.

A network controller 130 may couple to a set of gNBs and provide coordination and control for these gNBs. The network controller 130 may communicate with the gNBs 110 via a backhaul. The gNBs 110 may also communicate with one another, for example, directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a gNB, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving gNB, which is a gNB designated to serve the UE on the downlink and/or uplink. A finely dashed line with double arrows indicates interfering transmissions between a UE and a gNB.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (e.g., an RB) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of two half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240 . . . kHz).

In some examples, access to the air interface may be scheduled, wherein a scheduling entity (e.g., a gNB) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. gNBs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
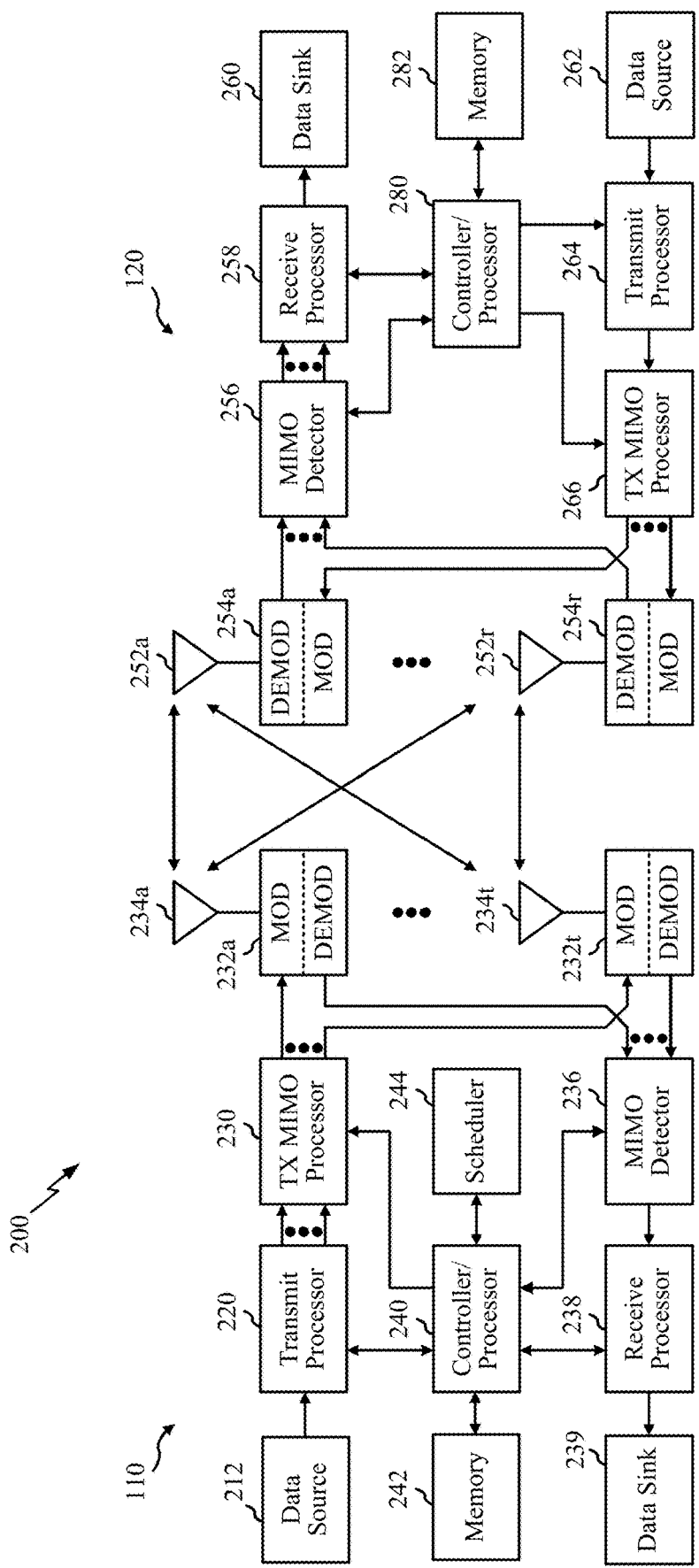
FIG. 2 is a block diagram conceptually illustrating a design of an example base station (BS) and user equipment (UE), in accordance with certain aspects of the present disclosure.

FIG. 2 illustrates example components of the gNB 110 and UE 120 illustrated in FIG. 1, which may be used to implement aspects of the present disclosure for frequency hopping for large bandwidth allocations. For example, antennas 252, Tx/Rx 222, processors 266, 258, 264, and/or controller/processor 280 of the UE 120 and/or antennas 234, processors 260, 220, 238, and/or controller/processor 240 of the gNB 110 may be used to perform the operations described herein and illustrated with reference to FIGS. 7 and 8.

FIG. 2 shows a block diagram of a design of a gNB 110 and a UE 120, which may be one of the gNBs and one of the UEs in FIG. 1. For a restricted association scenario, the gNB 110 may be the macro gNB 110c in FIG. 1, and the UE 120 may be the UE 120y. The gNB 110 may also be gNB of some other type. The gNB 110 may be equipped with antennas 234a through 234t, and the UE 120 may be equipped with antennas 252a through 252r.

At the gNB 110, a transmit processor 220 may receive data from a data source 212 and control information from a controller/processor 240. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 220 may process (e.g., encode and symbol map) the data and control information to obtain data symbols and control symbols, respectively. The processor 220 may also generate reference symbols, e.g., for the PSS, SSS, and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the gNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the Physical Uplink Shared Channel (PUSCH)) from a data source 262 and control information (e.g., for the Physical Uplink Control Channel (PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the gNB 110. At the gNB 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the gNB 110 and the UE 120, respectively. The processor 240 and/or other processors and modules at the gNB 110 may perform or direct, e.g., the execution of various processes for the techniques described herein. The processor 280 and/or other processors and modules at the UE 120 may also perform or direct, e.g., the execution of the functional blocks illustrated in FIGS. 7 and 8, and/or other processes for the techniques described herein.

Figure 3:
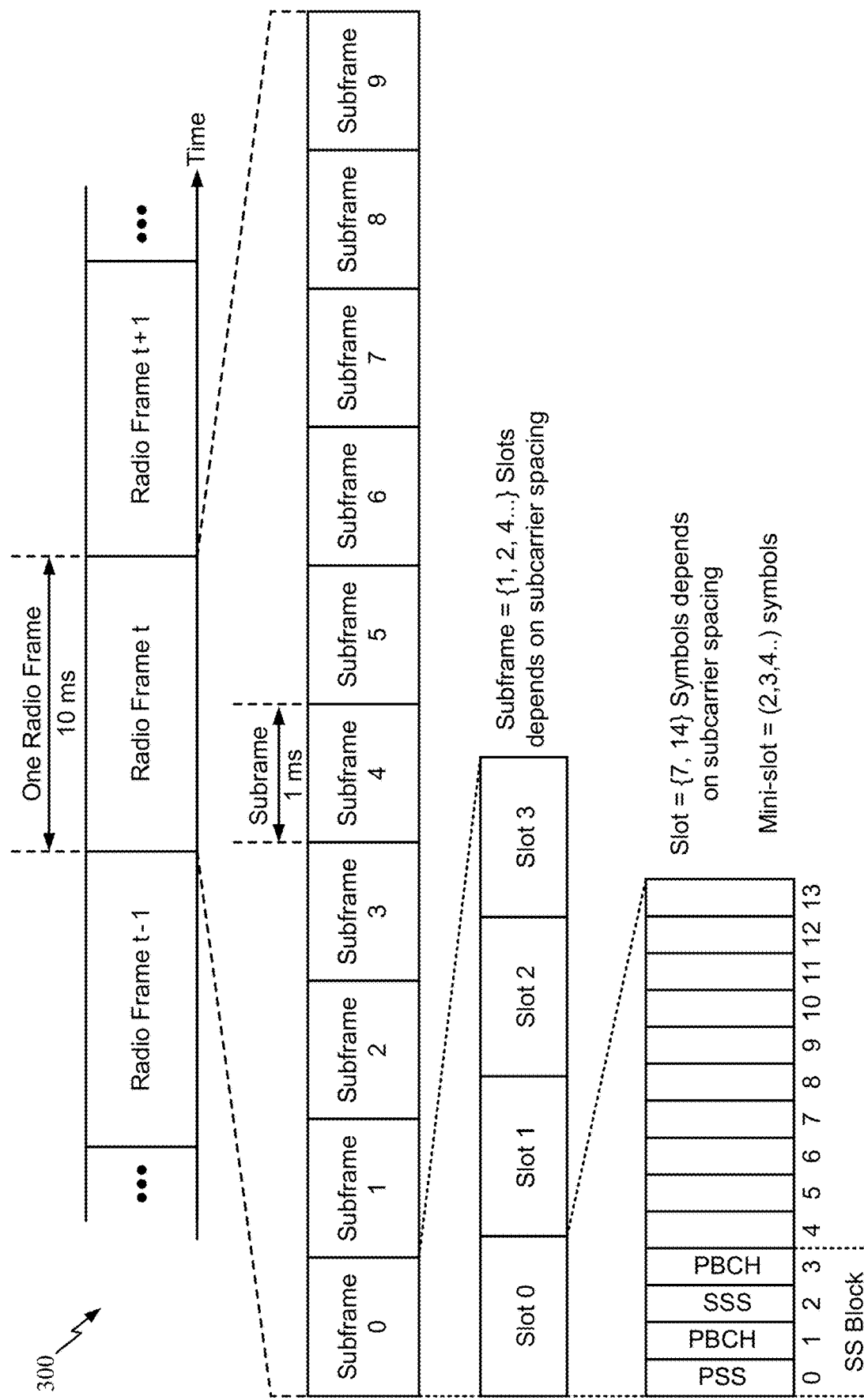
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

As noted above, LTE vehicle-to-everything (LTE-V2X) has been developed as a technology to address basic vehicular wireless communications to enhance road safety and the driving experience. In other systems, new radio vehicle-to-everything (NR-V2X) has been developed as an additional technology that covers more advanced communication use case to further enhance road safety and driving experience. Non-limiting embodiments for frequencies covered may be, for example, 3 GHz to 5 GHz. As described below, V2X system methods and apparatus may be applicable to both LTE-V2X and NR-V2X as well as other frequencies. Other frequency spectrums other than those covered by LTE-V2X and NR-V2X are also considered to be applicable to the description and as such, the disclosure should not be considered limiting.

Figure 5:
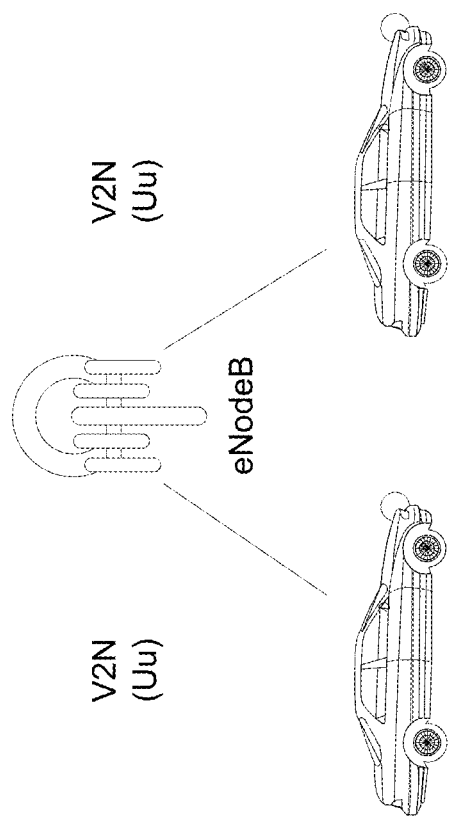
FIGS. 4 and 5 illustrate example V2X deployments, in which aspects of the present disclosure may be practiced.
Figure 4:
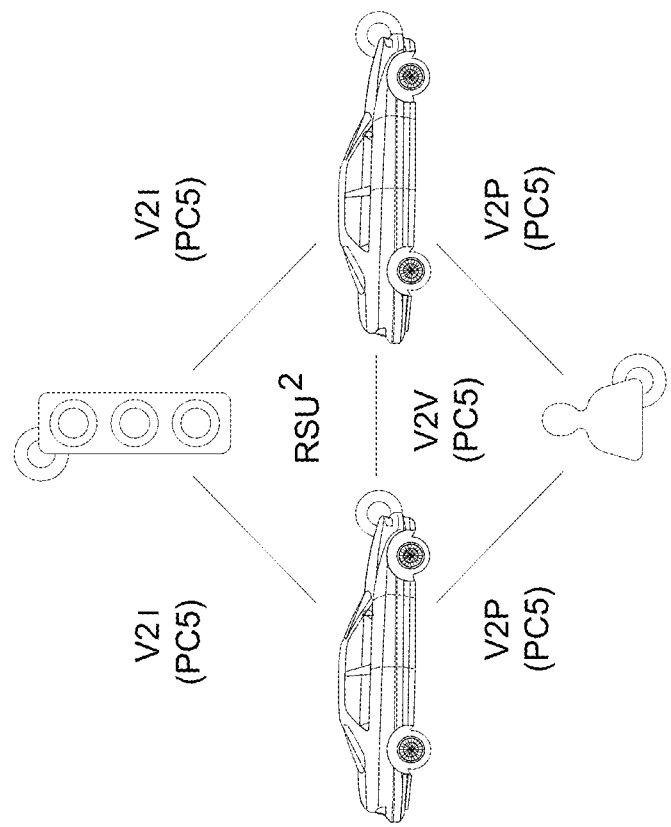

FIGS. 4 and 5 illustrate example V2X systems in which aspects of the present disclosure may be practiced. The V2X system, provided in FIGS. 4 and 5, provides two complementary transmission modes. A first transmission mode involves direct communications between participants in the local area. Such communications are illustrated in FIG. 4. A second transmission mode involves network communications through a network as illustrated in FIG. 5.

Referring to FIG. 4, the first transmission mode allows for direct communication between different participants in a given geographic location. As illustrated, a vehicle can have a communication with an individual (V2P) through a PC5 interface. Communications between a vehicle and another vehicle (V2V) may also occur through a PC5 interface. In a like manner, communication may occur from a vehicle to other highway components, such as a signal (V21) through a PC5 interface. In each embodiment illustrated, two-way communication can take place between elements, therefore each element may be a transmitter and a receiver of information. In the configuration provided, the first transmission mode is a self-managed system and no network assistance is provided. Such transmission modes provide for reduced cost and increased reliability as network service interruptions do not occur during handover operations for moving vehicles. Resource assignments do not need coordination between operators and subscription to a network is not necessary, therefore there is reduced complexity for such self-managed systems.

In one, non-limiting embodiment, the V2X system is configured to work in a 5.9 GHz spectrum, thus any vehicle with an equipped system may access this common frequency and share information. Such harmonized/common spectrum operations allows for safe operation. V2X operations may also co-exist with 802.11p operations by being placed on different channels, thus existing 802.11p operations will not be disturbed by the introduction of V2X systems. In one non-limiting embodiment, the V2X system may be operated in a 10 MHz band that describes/contains basic safety services. In other non-limiting embodiments, the V2X system may support advanced safety services in addition to basic safety services described above. In another non-limiting embodiment, the V2X system may be used in a 5G NR V2X configuration, which is configured to interface with a wide variety of devices. By utilizing a 5G NR V2X configuration, multi Gbps rates for download and upload may be provided. In a V2X system that uses a 5G NR V2X configuration, latency is kept low, for example 1 ms, to enhance operation of the V2X system, even in challenging environments.

Referring to FIG. 5, a second of two complementary transmission modes is illustrated. In the illustrated embodiment, a vehicle may communicate with another vehicle through network communications. These network communications may occur through discrete nodes, such as eNodeB, that send and receive information between vehicles. The network communications may be used, for example, for long range communications between vehicles, such as noting the presence of an accident approximately 1 mile ahead. Other types of communication may be sent by the node to vehicles, such as traffic flow conditions, road hazard warnings, environmental/weather reports, service station availability and other like data. Data can be obtained from cloud-based sharing services.

For network communications, residential service units (RSUs) may be utilized as well as 4G/5G small cell communication technologies to benefit in more highly covered areas to allow real time information to be shared among V2X users. As the number of RSUs diminishes, the V2X systems may rely more on small cell communications, as necessary.

In either of the two complementary transmission modes, higher layers may be leveraged to tune congestion control parameters. In high density vehicle deployment areas, using higher layers for such functions provides an enhanced performance on lower layers due to congestion control for PHY/MAC.

The vehicle systems that use V2X technologies have significant advantages over 802.11p technologies. Conventional 802.11p technologies have limited scaling capabilities and access control can be problematic. In V2X technologies, two vehicles apart from one another may use the same resource without incident as there are no denied access requests. V2X technologies also have advantages over 802.11p technologies as these V2X technologies are designed to meet latency requirements, even for moving vehicles, thus allowing for scheduling and access to resources in a timely manner.

In the instance of a blind curve scenario, road conditions may play an integral part in decision making opportunities for vehicles. V2X communications can provide for significant safety of operators where stopping distance estimations may be performed on a vehicle by vehicle basis. These stopping distance estimations allow for traffic to flow around courses, such as a blind curve, with greater vehicle safety, while maximizing the travel speed and efficiency.

Example Techniques for Improved Feedback for V2X Multicast Packets

As noted above, one challenge in V2X systems is how to ensure quality of service (QoS) objectives are met without overusing resources. One approach to achieve desired QoS is via blind retransmission, where a transmitter retransmits packets without feedback. As an example, if each transmission has a reliability of approximately 90%, a single blind retransmission may achieve a reliability of approximately 99%.

A disadvantage of this blind retransmission approach is that the retransmission occurs, even though the initial transmission may have been successfully received. In such cases, the retransmission not only wastes system resources (and power), but it may also cause interference to transmissions from other UEs. This is particularly problematic when a system is loaded to capacity and system resources are at a premium. In such cases, unnecessary blind retransmissions may significantly impact overall system performance. Referring to the example above, a reliability of 90% means that 90% of blind retransmissions are wasted.

With feedback-based retransmission schemes, a transmitter only re-transmits if it received a negative acknowledgment (NACK) feedback. While feedback based retransmission mechanisms help preserve system resources, the feedback that such mechanisms rely on may not be provided in all cases. For example, due to half duplex (HD) constraints, one device may not be able to receive (multicast) packets from another device if both devices are concurrently transmitting. More specifically, if a device is constrained to HD communications, that UE cannot decode control information that schedules a packet and, hence, is unable to send feedback.

Figure 6:
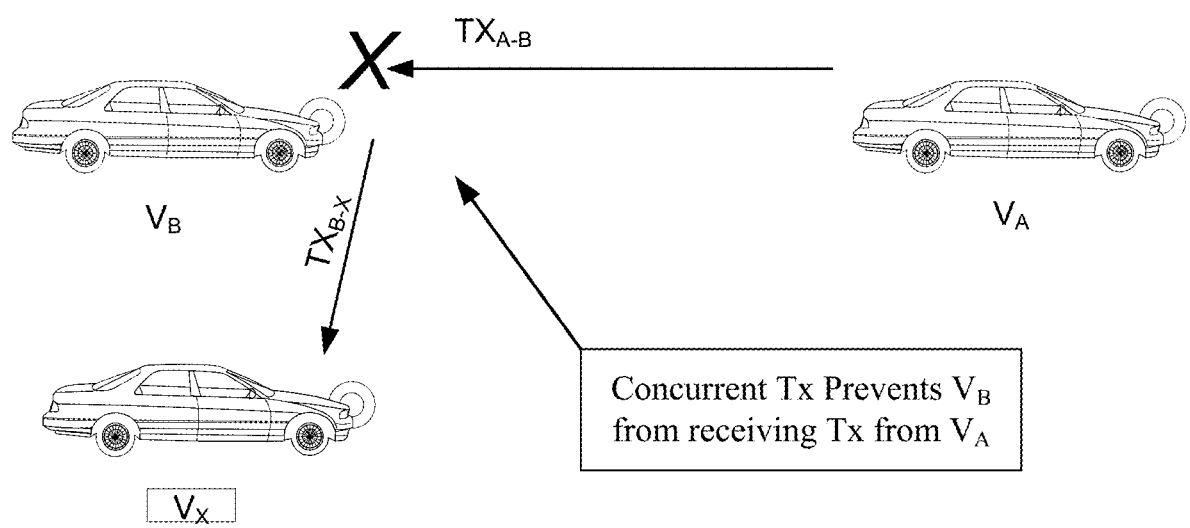
FIG. 6 illustrates how concurrent transmissions may hinder reception of multicast V2V communications.

FIG. 6 illustrates how concurrent transmissions may prevent a UE constrained to HD communications from providing feedback to prompt retransmission of a packet. In the illustrated example, a first vehicle $V_A$ sends a transmission $TX_{A-B}$ (e.g., a multicast packet) intended for a second vehicle $V_B$. In this example, $V_B$ is also transmitting (e.g., $TX_{B-X}$ to vehicle $V_X$) at the same time. As illustrated, the concurrent transmission of $V_A$ and $V_B$ prevents $V_B$ from receiving $TX_{A-B}$ from $V_A$. If the concurrent transmission prevents $V_B$ from decoding the control information, $V_A$ may not even be aware of the communication from $V_B$ and will not provide feedback. Thus, $V_A$ will not know to retransmit the communication to $V_B$.

Aspects of the present disclosure, however, propose a scheme in which a third device (e.g., a nearby device) may detect scenarios such as that depicted in FIG. 6 and provide feedback to the transmitting device on behalf of the other device. As a result, the transmitting device may only retransmit when it receives feedback, which may come from an intended target or, if a nearby device detects that target is concurrently transmitting, from the nearby device. This approach may help avoid unnecessary transmissions.

Figure 7:
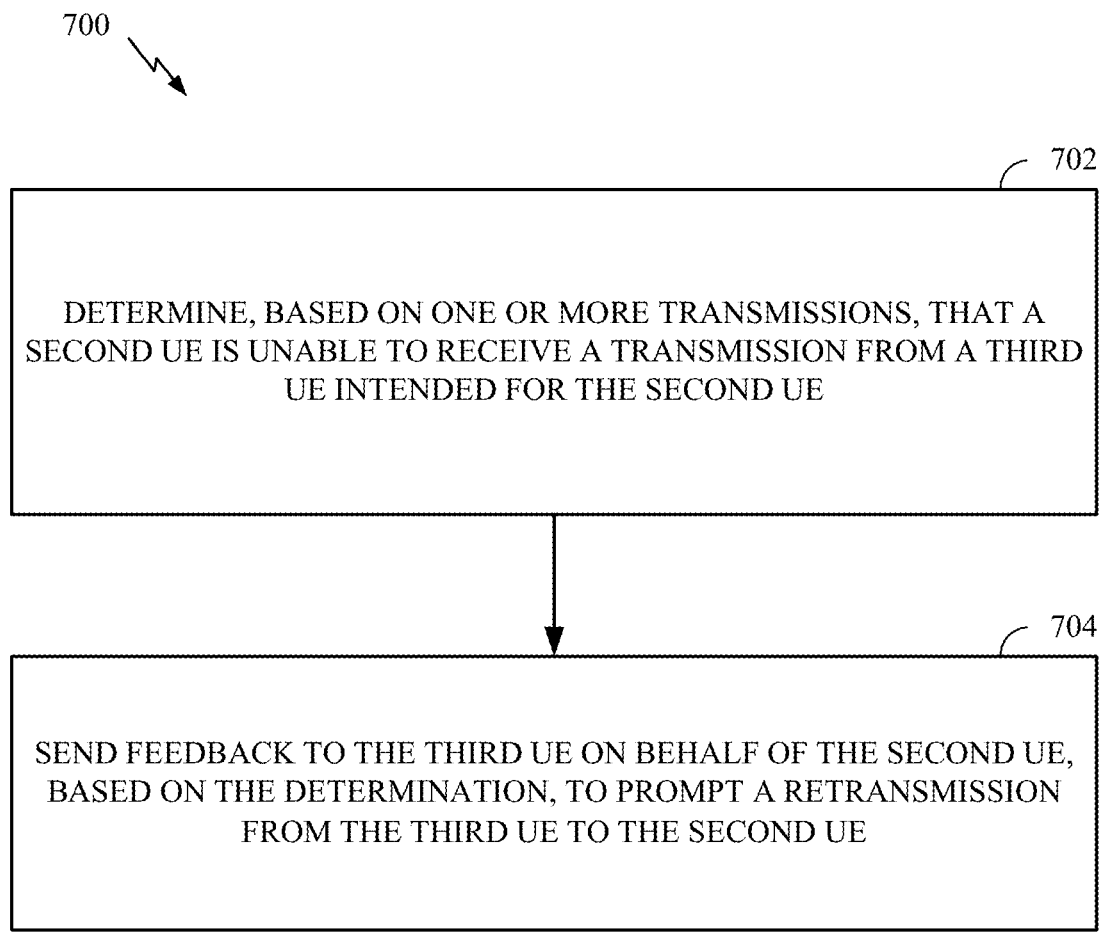
FIG. 7 illustrates example operations for wireless communication by a user equipment (UE), in accordance with certain aspects of the present disclosure.

FIG. 7 illustrates example operations 700 for wireless communication by a first UE that may help improve reliability of transmissions, (e.g., multicast V2V transmissions) between second and third UEs that is subject to concurrent transmissions. The operations 700 may be performed, for example, by a UE $120_{v-3}$ shown in FIG. 1 (to help assist in V2V communications between UE $120_{v-1}$ and $120_{v-2}$).

Operations 700 begin, at block 702, by determining, based on one or more transmissions, that a second UE is unable to receive a transmission from a third UE intended for the second UE. For example, the UE may detect concurrent transmissions by decoding control portions of transmissions from a UE scheduling a multicast transmission and determine that another UE (that is an intended recipient of that transmission) is transmitting at that time and not able to receive the transmission—or at least the control portion of that transmission.

At 704, the UE sends feedback to the third UE on behalf of the second UE, based on the determination, to prompt a retransmission from the third UE to the second UE. As will be described in greater detail below, the feedback could be a single bit corresponding to a NACK on behalf of the second UE or could provide additional information. Feedback sent on behalf of others may be referred to herein as half duplex (HD) feedback.

Figure 8:
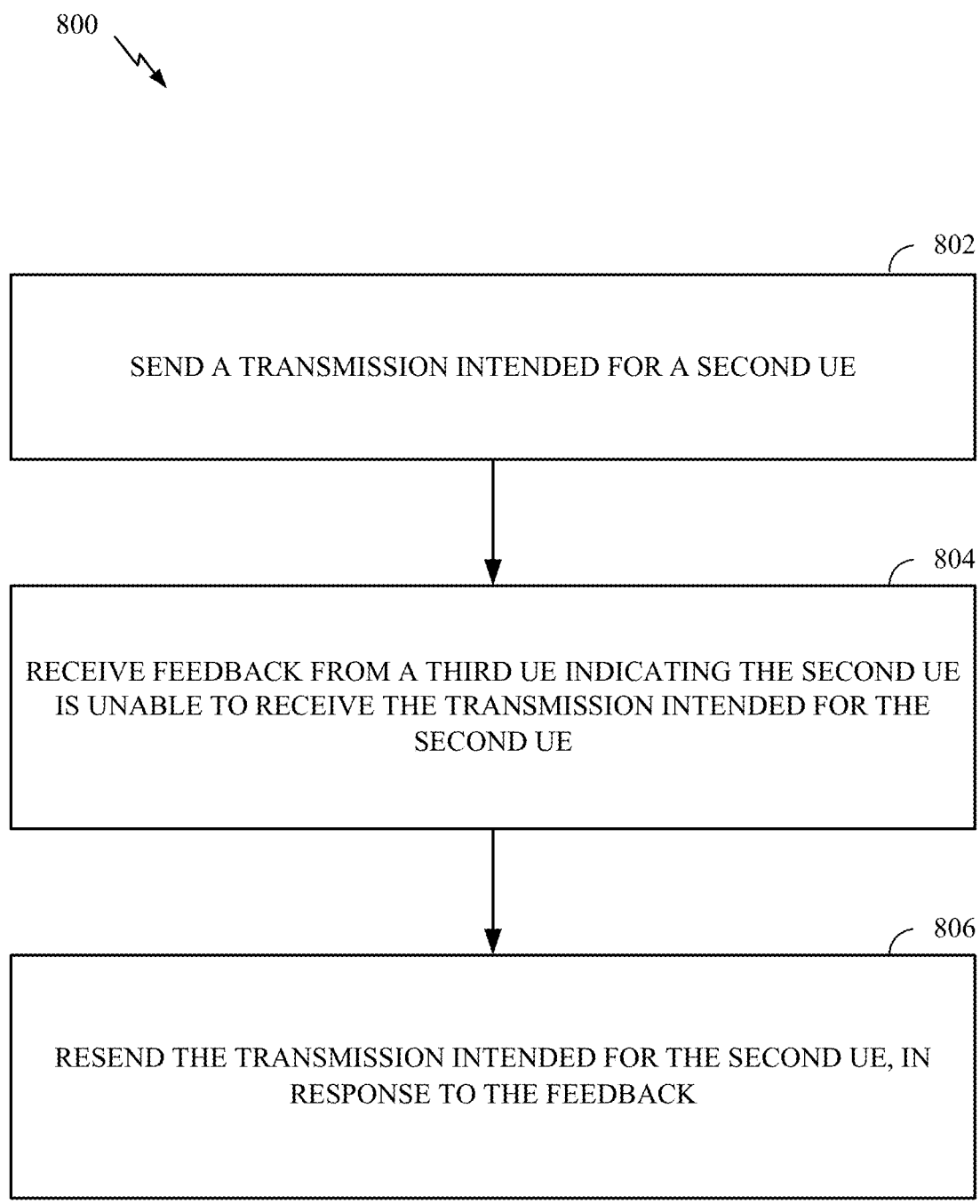
FIG. 8 illustrates example operations for wireless communication by a transmitting UE, in accordance with certain aspects of the present disclosure.

FIG. 8 illustrates example operations 800 for wireless communication by a UE transmitting multicast V2V communications. The operations 800 may be performed, for example, by a UE $120_{v-1}$ to retransmit data to UE $120_{v-2}$ based on feedback from sent from $120_{v-3}$ on behalf of $120_{v-2}$.

The operations 800 begin, at block 802, by sending a transmission intended for a second UE. At 804, the UE receiving feedback from a third UE indicating the second UE is unable to receive the transmission intended for the second UE. At 806, the UE resends the transmission intended for the second UE, in response to the feedback.

The "neighbor assisted" feedback solution proposed herein may help meet reliability and range requirements in V2V applications. For example, some applications may require a certain reliability at a given distance (e.g., 99% reliability at 300 meters).

Figure 9A:
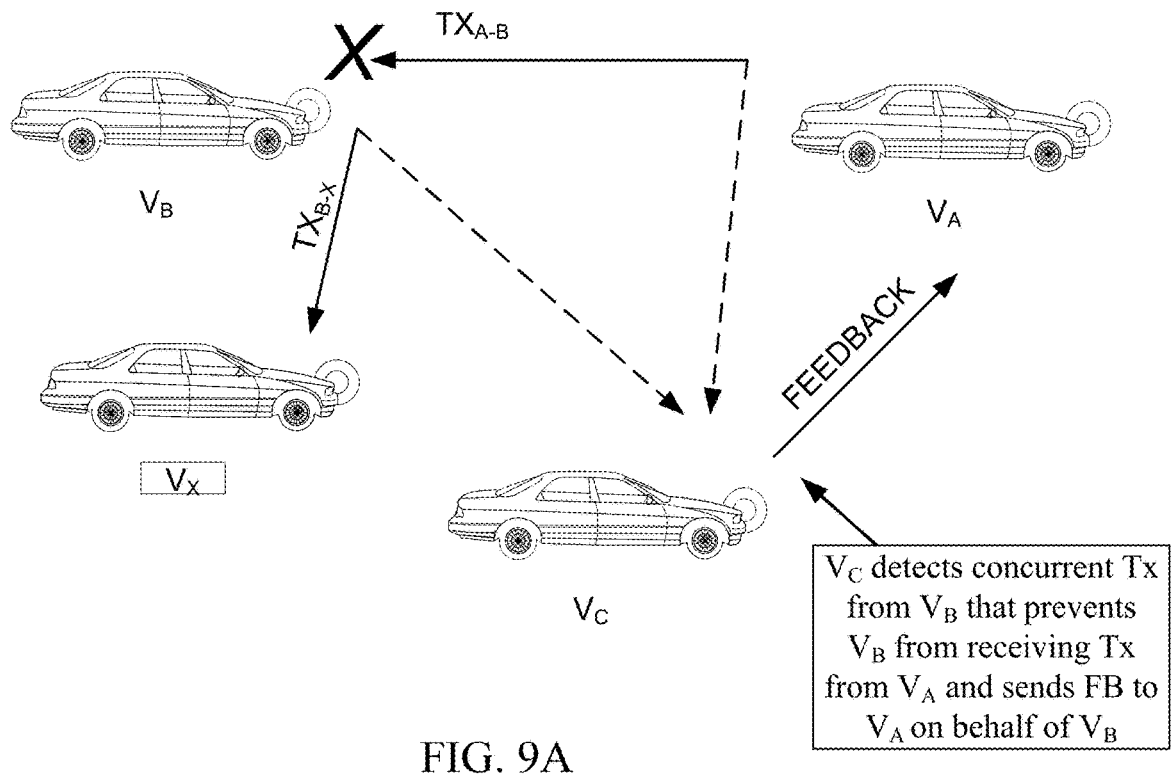
FIGS. 9A and 9B illustrate how a device may provide feedback in a multicast V2X environment, in accordance with certain aspects of the present disclosure.
Figure 9B:
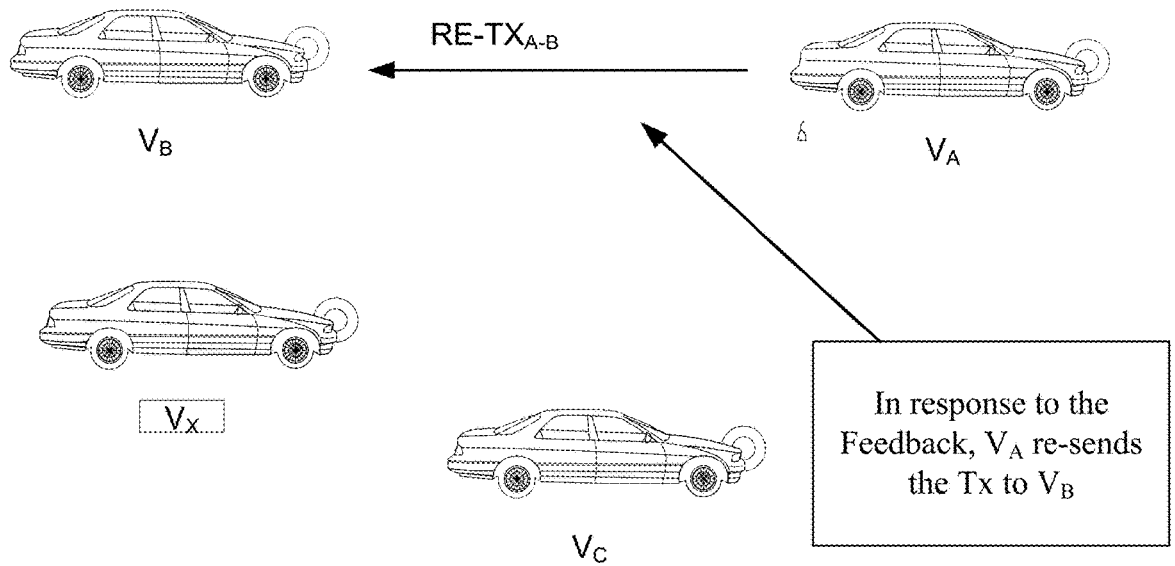

FIGS. 9A and 9B illustrate how a device may provide feedback in a multicast V2X environment, in accordance with certain aspects of the present disclosure. As in the example shown in FIG. 6, FIG. 9A a first vehicle $V_A$ sends a transmission $TX_{A-B}$ intended for a second vehicle $V_B$ while $V_B$ is also transmitting. Again, the concurrent transmission of $V_A$ and $V_B$ prevents $V_B$ from receiving $TX_{A-B}$ from $V_A$ and providing feedback. In other words, $V_A$ and $V_B$ may not even be aware of each other.

In this example, however, a third vehicle $V_c$ ("listening" nearby) is able to detect the concurrent transmission that prevents $V_B$ from receiving the transmission from $V_A$. $V_c$ may detect concurrent transmissions, for example, by decoding control portions of transmissions from $V_A$ and $V_B$, which may indicate the resources for scheduled transmissions. In response, knowing the location (or at least proximity) of $V_A$ and $V_B$, $V_c$ sends feedback to $V_A$, on behalf of $V_B$, indicating $V_B$ is not able to successfully receive the transmissions (or provide feedback). As illustrated in FIG. 9B, the feedback from $V_c$ may prompt $V_A$ to retransmit to $V_B$. In this manner, rather than blindly retransmit, $V_A$ only uses additional resources for retransmission when it receives feedback from $V_c$ on behalf of $V_B$ (or from $V_B$ directly).

In some cases, a combination of blind retransmission and the assisted feedback mechanism described herein may be used. For example, in some cases, an initial transmission may include one or more blind retransmissions (e.g., a packet may be initially transmitted 2 or 4 times) before any feedback is received. Then, if (NACK) feedback is received, the packet may be retransmitted (e.g., another 2 to 4 times). The number of blind retransmissions before and after feedback may vary and, in some cases could be specified via a standard or could be configured via radio resource control RRC signaling. In some cases, the number of blind retransmissions before and/or after feedback could be independently chosen for each packet by the transmitter, for example, depending on a range and/or reliability requirement of that packet. Using a combination of blind and feedback-based retransmissions in this manner may help achieve reliability and distance targets, providing a balanced tradeoff between reliability and resource consumption.

Figure 10:
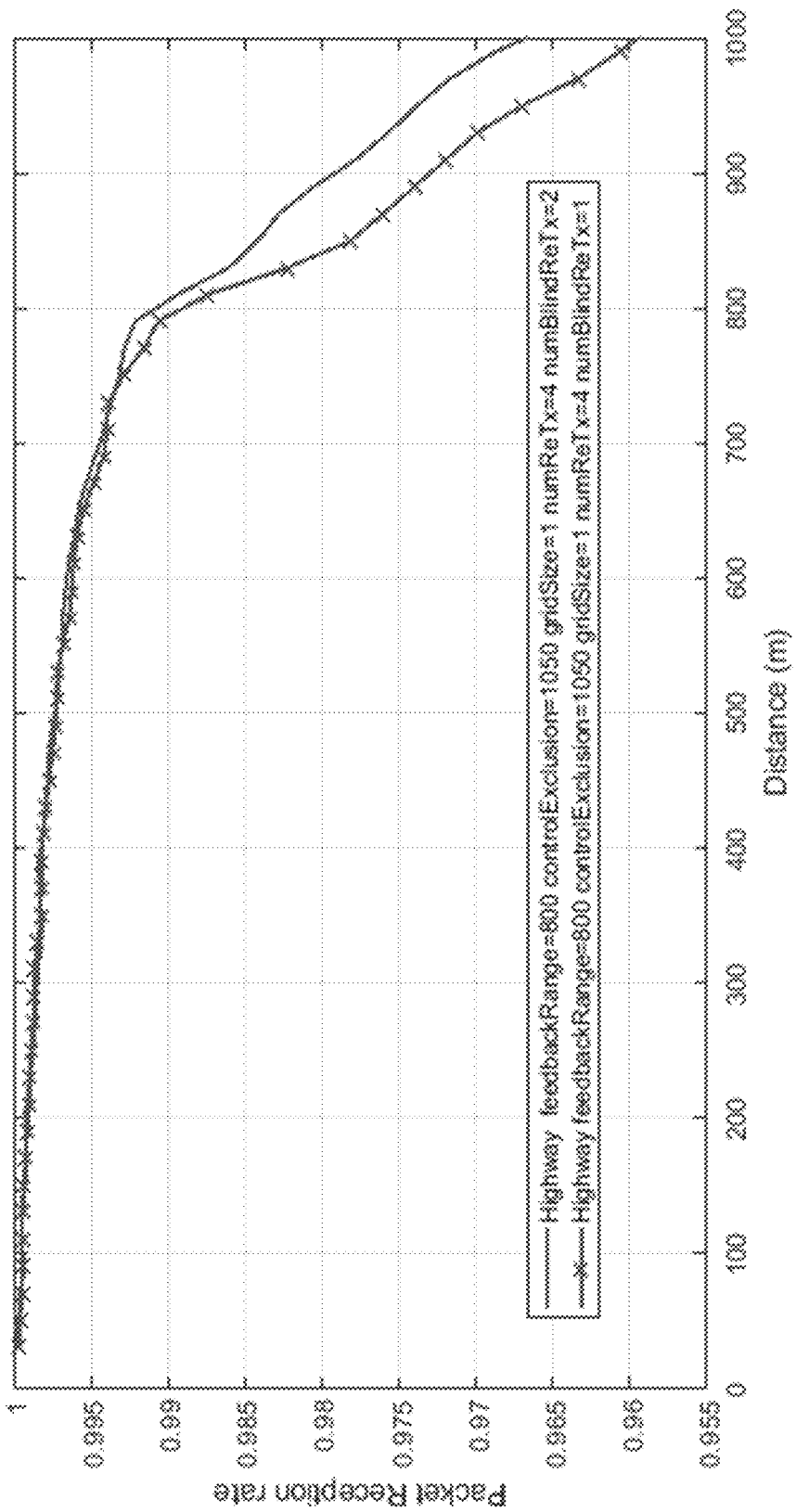
FIG. 10 illustrates example reliability measures at certain distances that may be achievable, in accordance with certain aspects of the present disclosure.

For example, FIG. 10 illustrates example packet reception rates possible with different retransmission scenarios. As illustrated, a packet reception rate of 0.99 may be achieved using a total number of 4 transmissions, with each including 1 or 2 blind retransmissions at a distance (e.g., between vehicles) of 800 meters. As may be expected, the packet reception rate may drop off a little slower when there are 2 blind retransmissions when compared to the single blind transmission scenario, albeit at a cost in terms of system resources.

In some cases, feedback sent on behalf of another device may be sent using the same feedback resources that device uses. In such cases, a device receiving the feedback may not need to distinguish which device is providing the feedback.

In other cases, the half duplex (HD) feedback (e.g., feedback sent of behalf of other UEs being affected by a half duplex constraint) may be sent using separated feedback resources and/or a different sequence compared to the normal ACK/NACK feedback (provided by the actual target device). In some cases, HD feedback may provide additional information (e.g., be "overloaded"). For example, a device may provide an indication that the feedback is provided on behalf of another UE (e.g., this feedback could be provided by a single bit that indicates whether feedback is for itself or on behalf of another UE).

In some cases, the feedback may, in effect, serve as a clear-to-send (CTS) mechanism to provide receiver side protection. In other words, some (or all) UEs receiving the ACK/NACK feedback may refrain from transmitting on the same resources reserved by the transmitting device for retransmission. In some cases, a transmitter may go ahead and reserve resources for retransmission. In such cases, NACK feedback may serve to confirm there will, in fact, be a retransmission on these resources. Otherwise, absent NACK feedback, the initial transmission may be assumed to have been received successfully and the resources reserved for retransmission may be considered available.

Referring again to FIGS. 9A and 9B, while the illustrated examples show only a few cars, in practice there may be many cars participating in the assisted type feedback described herein. Many UEs sending HD feedback (on behalf of others) and normal feedback (on behalf of themselves) at the same time may be problematic, for example, causing in-band emissions and/or in-band selectivity issues. In addition, many UEs sending HD feedback or normal feedback may lead to a false alarm, triggering a retransmission when one should not be triggered. For example, a false alarm may occur two transmitters that are far apart choose the same feedback sequence to provide HD feedback on behalf of two different UEs.

In some cases, one or more mechanisms may be employed to try and limit the amount of UEs sending HD (and normal) feedback at any given time. For example, in some cases, a UE may be configured to only send HD feedback (to prompt retransmission of a packet) when that UE is within proximity of the packet transmitter. In some cases, a UE may estimate an actual distance or could condition sending HD feedback on a parameter from which distance may be inferred, such as reference signal receive power (RSRP). In any case, power control may also be employed to limit the impact of multiple UEs providing feedback at any given time. For example, a UE may determine transmit power for providing feedback based on distance (or RSRP).

There are other scenarios in which a UE may refrain from providing HD feedback on behalf of another UE. For example, a UE may prioritize sending its own NACK feedback, or its own other type of transmission, over sending HD NACK feedback on behalf of another UE.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, processors 266, 258, 264, and/or controller/processor 280 of the UE 120 shown in FIG. 2 may be configured to perform operations 700 of FIG. 7 and/or operations 800 of FIG. 8.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first user equipment (UE), comprising:
    monitoring transmissions from at least one of: a second UE or a third UE;
    decoding a control portion of a transmission of the transmissions that indicates resources for the transmission from the third UE to the second UE, wherein the transmission is from the third UE;

determining, based on the indicated resources for the transmission and the monitored transmissions from the second UE to at least a fourth UE, that the second UE is unable to receive the transmission from the third UE to the second UE on the indicated resources for the transmission; and sending feedback to the third UE on behalf of the second UE, based on the determination, to prompt a retransmission from the third UE to the second UE.

2. The method of claim 1, wherein the transmissions comprise vehicle to vehicle (V2V) or vehicle to everything (V2X) transmissions.

3. The method of claim 1, wherein the first UE provides the feedback using resources that are different than resources used to provide acknowledgment feedback by the second UE to the third UE.

4. The method of claim 1, wherein the first UE provides the feedback using resources that are the same as resources used to provide acknowledgment feedback by the second UE to the third UE.

5. The method of claim 1, wherein the first UE provides the feedback using resources that comprise a combination of:
   time and frequency resources; and
   a feedback sequence.

6. The method of claim 1, wherein the feedback also causes one or more other UEs to back off from transmitting using the indicated resources for the retransmission.

7. The method of claim 1, wherein the feedback provides an indication that the feedback is provided by the first UE on behalf of the second UE.

8. The method of claim 1, further comprising determining whether the first UE is within a proximity to the third UE, wherein the first UE sends the feedback only if the first UE determines it is within the proximity to the third UE.

9. The method of claim 8, wherein determining the first UE is within the proximity to the third UE is based on a determined distance or a reference signal receive power (RSRP).

10. The method of claim 1, further comprising applying power control when providing the feedback, the power control being based on a determined distance from the first UE to at least one of: the second or third UE.

11. The method of claim 1, further comprising prioritizing at least one of: providing feedback for the first UE or transmission by the first UE over providing the feedback on behalf of the second UE.

12. A method for wireless communications by a first user equipment (UE), comprising:
   sending a transmission intended for a second UE, the transmission including a control portion that indicates resources for the transmission intended for the second UE;
   receiving feedback from a third UE indicating the second UE is unable to receive the transmission intended for the second UE; and
   resending the transmission intended for the second UE, in response to the feedback.

13. The method of claim 12, wherein the transmission intended for the second UE comprises vehicle to vehicle (V2V) or vehicle to everything (V2X) transmissions.

14. The method of claim 12, wherein the third UE provides the feedback using resources that are different than resources used to provide acknowledgment feedback by the second UE to the first UE.

15. The method of claim 12, wherein the feedback provides an indication that the feedback is provided by the third UE on behalf of the second UE.

16. The method of claim 12, wherein:
   sending the transmission intended for the second UE involves sending at least one blind retransmission.

17. An apparatus for wireless communications by a first user equipment (UE), comprising:
   means for monitoring transmissions from at least one of: a second UE or a third UE;
   means for decoding a control portion of a transmission of the transmissions that indicates resources for the transmission from the third UE to the second UE, wherein the transmission is from the third UE;
   means for determining, based on the indicated resources for the transmission and the monitored transmissions from the second UE to at least a fourth UE, that the second UE is unable to receive the transmission from the third UE to the second UE on the indicated resources for the transmission; and
   means for sending feedback to the third UE on behalf of the second UE, based on the determination, to prompt a retransmission from the third UE to the second UE.

18. The apparatus of claim 17, wherein the transmissions comprise vehicle to vehicle (V2V) or vehicle to everything (V2X) transmissions.

19. The apparatus of claim 17, wherein the means for sending the feedback is configured to send the feedback using resources that are the same as resources used to provide acknowledgment feedback by the second UE to the third UE.

20. The apparatus of claim 17, wherein the feedback provides an indication that the feedback is provided by the first UE on behalf of the second UE.

21. The apparatus of claim 17, further comprising:
   means for determining whether the first UE is within a proximity to the third UE; and
   wherein the means for sending the feedback is configured to send the feedback only if the first UE determines it is within the proximity to the third UE.

22. An apparatus for wireless communications by a first user equipment (UE), comprising:
   means for sending a transmission intended for a second UE, the transmission including a control portion that indicates resources for the transmission intended for the second UE;
   means for receiving feedback from a third UE indicating the second UE is unable to receive the transmission intended for the second UE; and
   means for resending the transmission intended for the second UE, in response to the feedback.

23. The apparatus of claim 22, wherein the transmission intended for the second UE comprises vehicle to vehicle (V2V) or vehicle to everything (V2X) transmissions.

24. The apparatus of claim 22, wherein the means for receiving the feedback is configured to receive the feedback using resources that are different than resources used to provide acknowledgment feedback by the second UE to the first UE.

25. The apparatus of claim 22, wherein the feedback provides an indication that the feedback is provided by the third UE on behalf of the second UE.

26. The apparatus of claim 22, wherein the means for sending the transmission intended for the second UE is configured to send at least one blind retransmission.

* * * * *